(12) United States Patent
Hayes

(10) Patent No.: US 7,366,554 B2
(45) Date of Patent: Apr. 29, 2008

(54) REDUCTION OF NEAR FIELD E-M SCATTERING USING HIGH IMPEDANCE COATING MATERIALS

(75) Inventor: Gerard James Hayes, Wake Forest, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 175 days.

(21) Appl. No.: 10/710,864

(22) Filed: Aug. 9, 2004

(65) Prior Publication Data

US 2006/0029217 A1 Feb. 9, 2006

(51) Int. Cl.
*H04M 1/00* (2006.01)

(52) U.S. Cl. .................. 455/575.5; 379/90.3; 428/469; 428/472; 455/90.3; 455/575.7

(58) Field of Classification Search ................ 428/469, 428/457; 455/575.5, 575.7, 90.3; 379/446
See application file for complete search history.

(56) References Cited

U.S. PATENT DOCUMENTS

| | | | |
|---|---|---|---|
| 5,335,366 A * | 8/1994 | Daniels | 455/575.5 |
| 5,726,383 A * | 3/1998 | Geller et al. | 174/380 |
| 6,110,563 A * | 8/2000 | Pienimaa et al. | 174/394 |
| 6,745,057 B1 * | 6/2004 | Hankui | 455/90.3 |
| 2003/0040345 A1 * | 2/2003 | Berger et al. | 455/575 |

FOREIGN PATENT DOCUMENTS

| | | |
|---|---|---|
| EP | 0805562 | 11/1997 |
| WO | WO 95/31048 | 11/1995 |

OTHER PUBLICATIONS

Sony Ericsson Mobile Communications AB, "International Application No. PCT/US05/006507" *International Search Report*, Jun. 22, 2005.
Sony Ericsson Mobile Communications AB, "International Application No. PCT/US05/006507" *Written Opinion*, Jun. 22, 2005.
Sony Ericsson Mobile Communications AB, PCT/US2005/006507, International Preliminary Report on Patentability, Dec. 4, 2006.

* cited by examiner

*Primary Examiner*—Archene Turner
(74) *Attorney, Agent, or Firm*—Frederick D. Bailey; Moore & Van Allen, PLLC

(57) ABSTRACT

The present invention selectively uses a high-impedance layer to reduce the effects of E-M scattering at metallic discontinuities. The high-impedance layer can be fabricated using a combination of metallic and resistive materials that are typically used in electro-static discharging (ESD) applications. A thin layer of metal can be deposited on the surface of a dielectric substrate such as polyethylene. This metallic layer can be on an inner, outer, or buried layer of the material. The metallic layer allows the RF induced currents to spread out over a designated surface area. A layer of resistive material can be applied to a similar dielectric layer. The resistive layer provides sufficient attenuation to decrease the RF surface waves and minimize electro-magnetic scattering on the printed circuit board (PCB). Furthermore, since the metallic and resistive materials can be applied in very thin layers, sufficient transparency can be preserved in desired areas such as the mobile phone's display region.

10 Claims, 6 Drawing Sheets

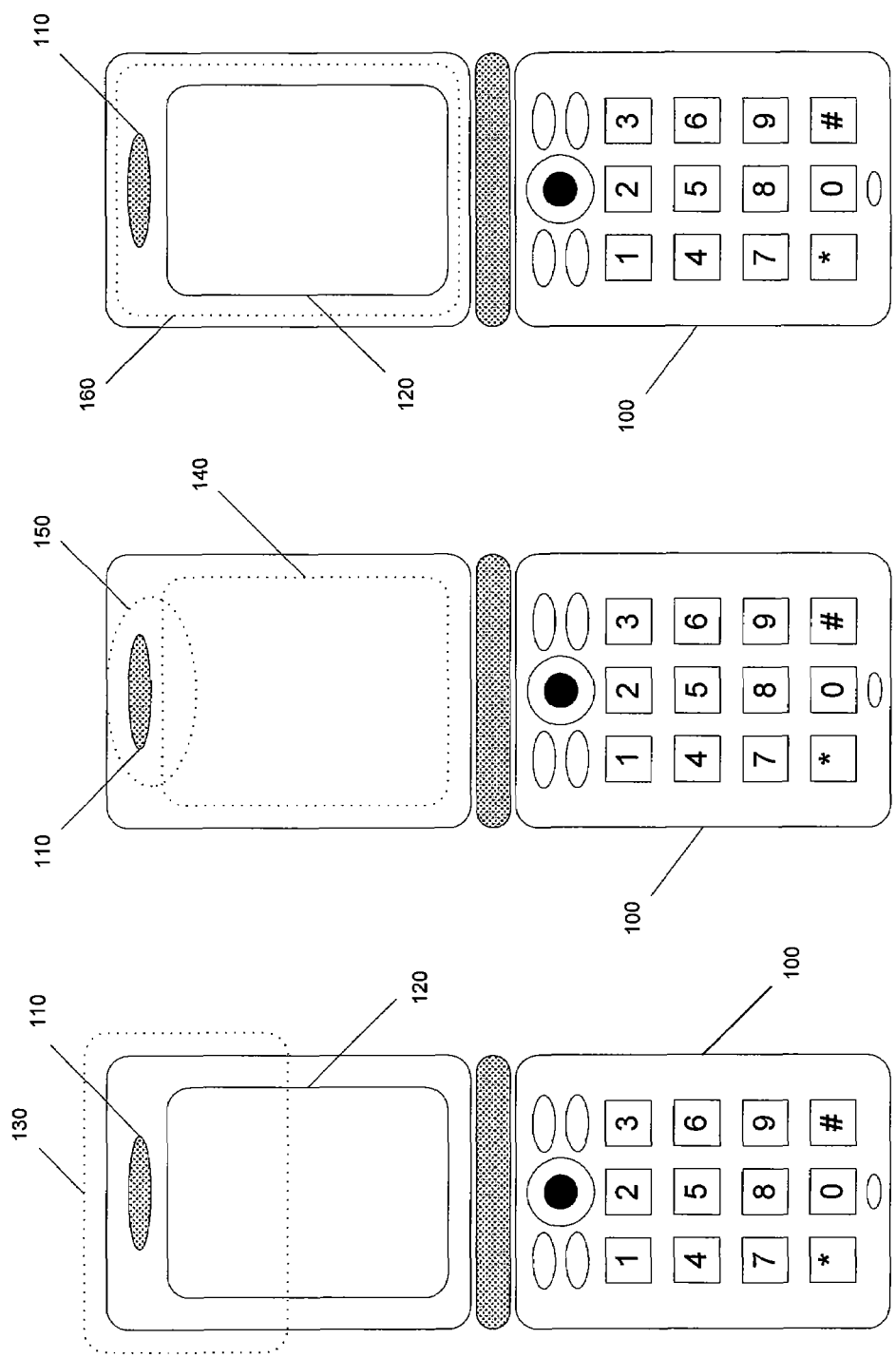

REDUCTION OF NEAR FIELD E-M SCATTERING USING HIGH IMPEDANCE COATING MATERIALS

BACKGROUND ART

The United States Federal Communications Commission (FCC) is set to enact new regulations in 2005 to improve hearing aid compatibility (HAC) for hearing impaired users of mobile phones. As part of mobile phone HAC assessment, near field components of electro-magnetic fields are measured. The components are comprised of electric and magnetic fields.

FIG. 3 illustrates a typical electric field distribution for a flip-type mobile phone having a near field scan area as shown in FIG. 1 and a PCB outline as shown in FIG. 2. The dominant electric fields tend to occur at abrupt discontinuities of metallization such as at the edges of printed circuit boards (PCBs), shield cans, vibrators, and metallization patterns on the assembly. These discontinuities form concentrated electric currents on the metallic substrates that flow toward the edges of a substrate. When the current reaches an edge of a substrate, undesirable scattering of electro-magnetic fields occurs. The greater the magnitude of scattered fields, the more likely they are to interfere with hearing aid devices.

What is needed is a method, means, or apparatus for reducing the undesirable effects of electro-magnetic scattering at metallic discontinuities that exist within mobile phone designs.

BEST MODE FOR CARRYING OUT THE INVENTION

The present invention employs a high-impedance layer to reduce the effects of E-M scattering at metallic discontinuities. The high-impedance layer can be fabricated using a combination of metallic and resistive materials that are typically used in electro-static discharging (ESD) applications.

For example, a thin layer of metal (typically aluminum) can be deposited on the surface of a dielectric substrate such as polyethylene. The metallic layer can be applied to the inner surface of the dielectric substrate, the outer surface of the dielectric substrate, or buried within two dielectric substrates. The metallic layer allows RF induced currents to spread out over a designated surface area. Similarly, a layer of resistive material can be applied to the dielectric substrate. The resistive layer provides sufficient attenuation to decrease the RF surface waves and minimize electromagnetic scattering. Furthermore, since these materials can be applied in very thin layers, sufficient transparency can be preserved in desired areas such as the mobile phone's display region.

BRIEF DESCRIPTION OF THE DRAWINGS

FIG. 1 is an illustration of a typical flip type mobile phone showing a near field scan area.

FIG. 2 is an illustration of a typical flip type mobile phone with a sample PCB outline depicted and showing an area of high field occurrence.

FIG. 4 is a front view illustration of a flip type mobile phone having a high impedance cover according to the present invention.

DISCLOSURE OF INVENTION

Figure 3:
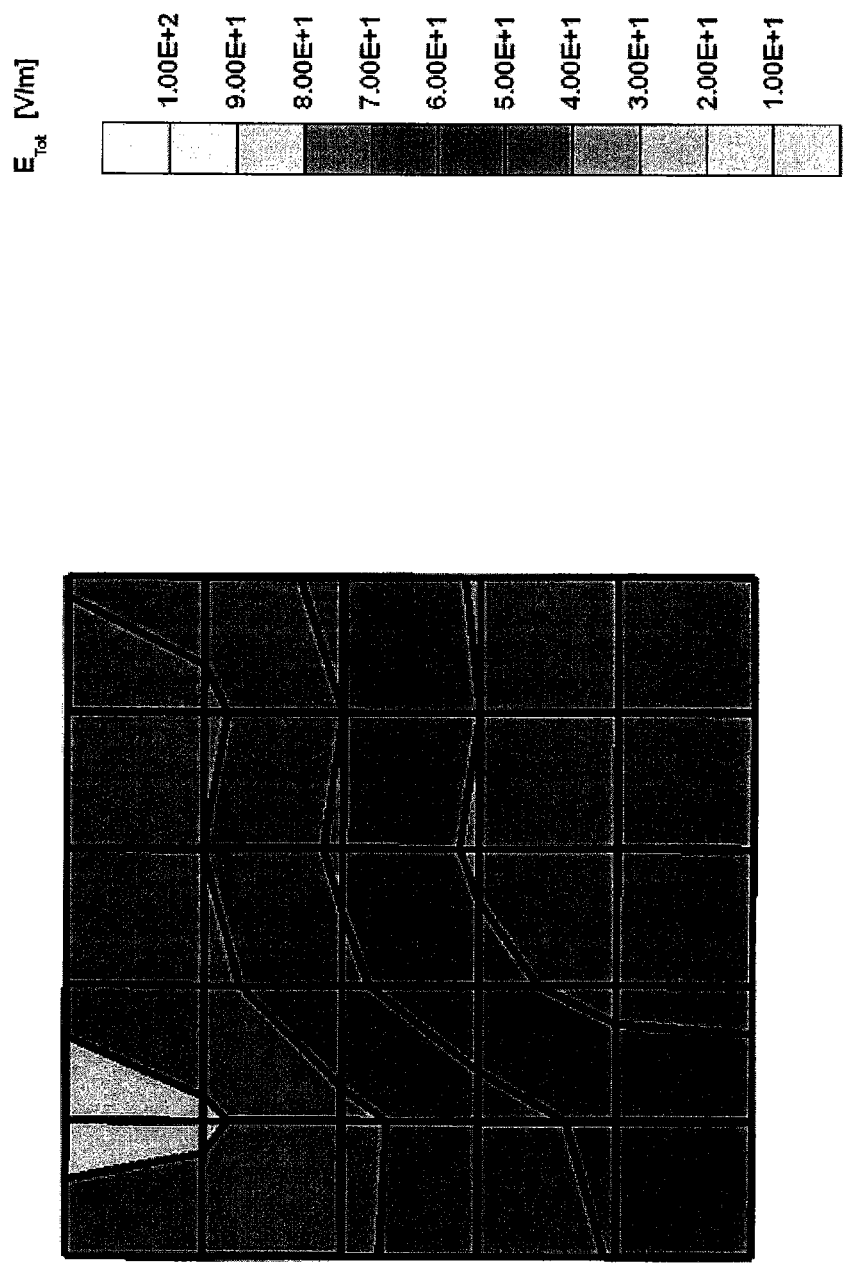
FIG. 3 is a graph of a measured electric field for a specified near field scan area of a flip type mobile phone without a high impedance cover.

As part of hearing aid compatibility (HAC) assessment, near-field components of electro-magnetic fields are measured. These components comprise electric and magnetic fields.

FIG. 1 is an illustration of a typical flip type mobile phone 100 showing an outline of a near field scan area 130 in the top-flip around the speaker component 110 and partially encompassing the mobile phone's display 120. This is the area of greatest concern since it is the point at which a user with a hearing aid will be in closest proximity to the E-M scattering effect. FIG. 2 is an illustration of the same mobile phone 100 further showing a high field area 150 about the mobile phone's speaker 110 and an outline of an underlying printed circuit board (PCB) 140. The relatively high fields are primarily the result of metallization discontinuities present in some of the underlying mobile phone components such as the PCB 140.

A sample electric field distribution for the mobile phone 100 of FIGS. 1 and 2 is presented in FIG. 3. The dominant electric fields occur at abrupt discontinuities of metallization such as, but not limited to, the edge of the printed circuit board (PCB), edge of shield cans, speakers, vibrators, and the edge of metallization patterns on the assembly. These discontinuities establish concentrated points of electro-magnetic scattering. The radiation from the mobile phone's antenna excites currents on the metallic substrates that flow towards the edge of the substrate. When the currents hit the edge of the substrate, scattering fields are generated.

The present invention utilizes a high impedance layer to reduce the unwanted effects of electro-magnetic scattering at metallic discontinuities that exist within mobile phone designs. The high impedance layer can be fabricated using a combination of materials that are typically used in electro-static discharging (ESD) applications. Such materials include metallic materials and resistive materials.

Figure 5:
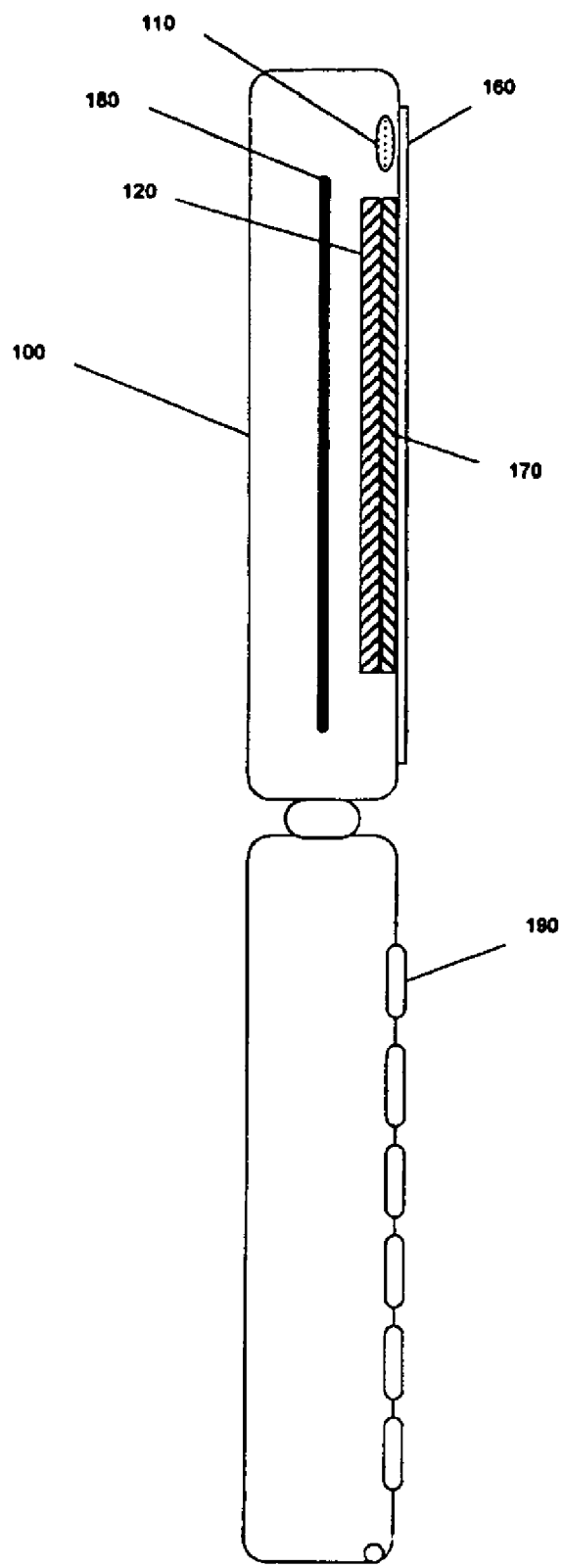
FIG. 5 is a side view illustration of a flip type mobile phone having a high impedance cover according to the present invention.

FIGS. 4 and 5 illustrate a front and side view respectively of a mobile phone that incorporates a high impedance layer 160 according to the present invention. The side view of FIG. 5 provides a perspective that shows the high impedance layer covering the majority of the surface of the top-flip of mobile phone 100. In this embodiment, a PCB 180 is shown positioned within the top-flip portion of the mobile phone 100. During normal operation, the PCB 180 will generate extraneous E-M fields that will scatter. As described earlier, the scattering effect is greatest at points of abrupt discontinuities like the edges of the PCB 180. The top edge of the PCB is in relatively close proximity to the speaker 110 of the mobile phone. The speaker is obviously the place that the user will press their ear against to use the mobile phone. If the user employs a hearing aid, then the hearing aid will be brought into close proximity of the scattering E-M fields generated within the mobile phone. These E-M fields may have an adverse effect on the user's hearing aid. To combat this result, the mobile phone utilizes the high impedance layer 160 to minimize the E-M scattering effect that the mobile phone may have on a user's hearing aid.

FIG. 5 also illustrates the mobile phone's display 120 and a protective display (LCD) cover 170. The high impedance layer 160 is shown covering the protective display cover 170 and speaker 110. This is but one positional implementation of the high impedance cover 160. The high impedance layer 160 can also be integrated into the protective display cover 170 or integrated into the mobile phone's general housing. Thus, the high impedance layer 160 can be sprayed (deposited) on the surface of mobile phone 100 such that the high impedance layer 160 lies between the user's ear and the components that generate extraneous E-M scattering.

For illustrative purposes, the bottom-flip portion of mobile phone 100 has been illustrated and includes a depiction of a keypad 190.

Figure 6A:
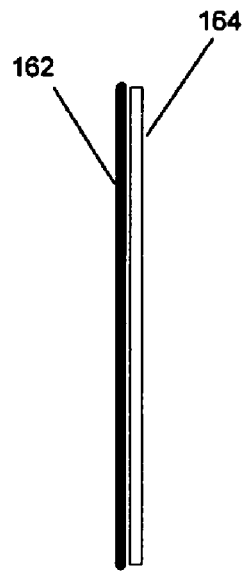
FIGS. 6a-6c illustrate three configurations of the high impedance cover using a metallic layer.
Figure 6B:
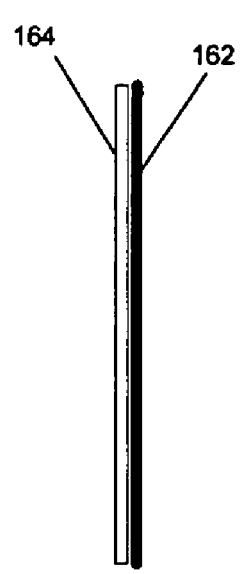
Figure 6C:
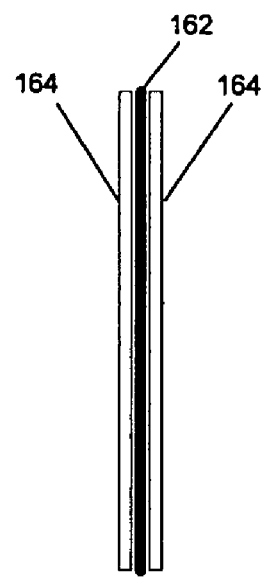

FIGS. 6a-6c illustrate configurations of the high impedance layer 160. FIG. 6a shows a metallic layer 162 coupled to the inner surface of a dielectric substrate layer 164. FIG. 6b shows a metallic layer 162 coupled to the outer surface of a dielectric substrate layer 164. FIG. 6c shows a metallic layer 162 sandwiched between two dielectric substrate layers 164.

Figure 7A:
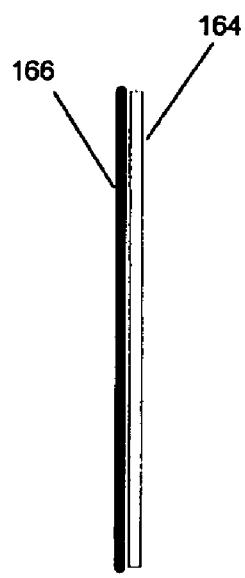
FIGS. 7a-7c illustrate three configurations of the high impedance cover using a resistive layer.
Figure 7B:
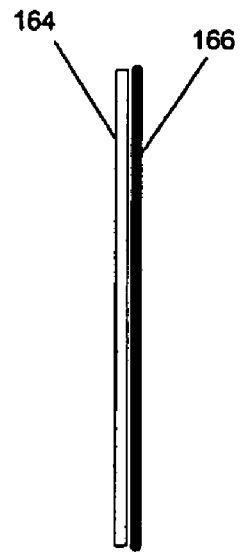
Figure 7C:
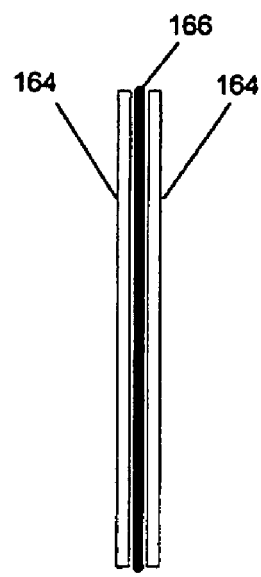

FIGS. 7a-7c illustrate three additional configurations of the high impedance layer 160. FIG. 7a shows a resistive layer 166 coupled to the inner surface of a dielectric substrate layer 164. FIG. 7b shows a resistive layer 166 coupled to the outer surface of a dielectric substrate layer 164. FIG. 7c shows a resistive layer 166 sandwiched between two dielectric substrate layers 164.

Figure 8:
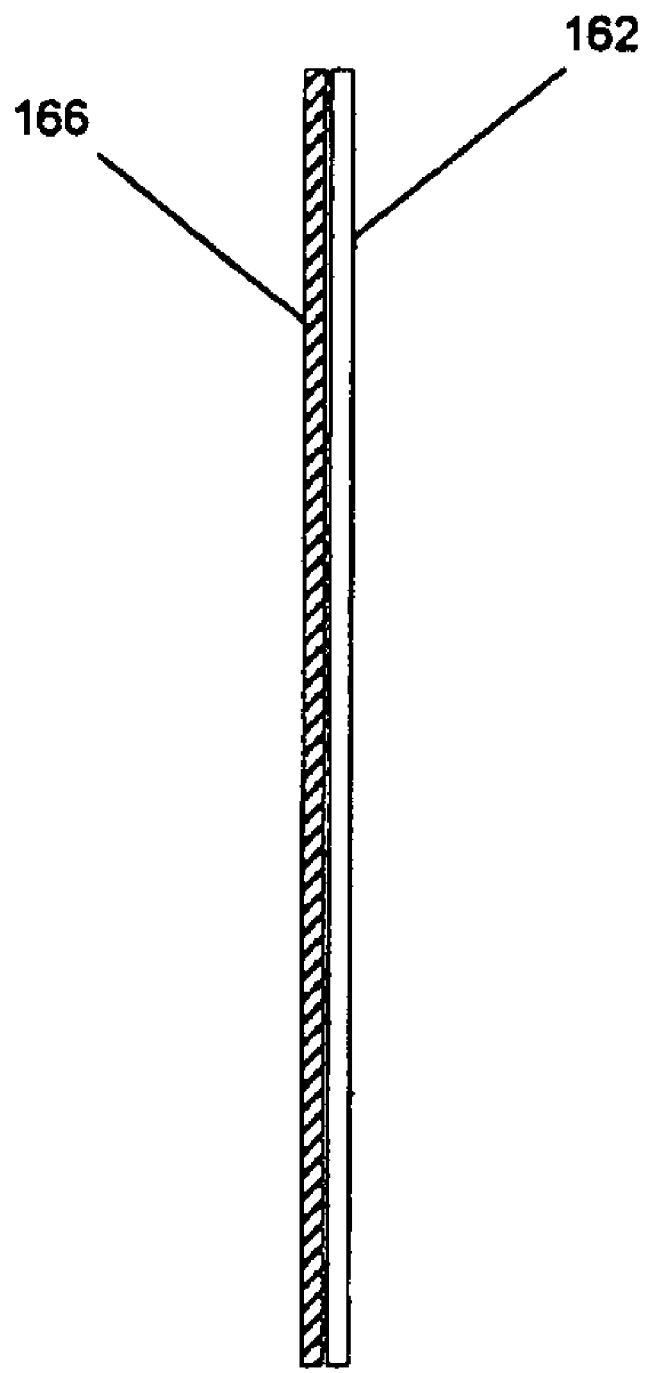
FIG. 8 illustrates a configuration of the high impedance cover using a resistive layer and a metallic layer.

FIG. 8 illustrates another configuration of the high impedance layer 160 in which a metallic layer 162 is coupled to a resistive layer 166.

As an example, a thin layer of metal (e.g., aluminum, copper, nickel) is deposited on the surface of a dielectric substrate such as polyethylene, polyimide, or Teflon™. This metallic layer can be on an inner (FIG. 6a), outer (FIG. 6b), or buried (FIG. 6c) within the dielectric substrate. The thin metallic layer allows RF induced currents to spread out over a designated surface area. Similarly, a layer of resistive (electrically lossy) material such as carbon, indium, or ferrites can be applied to a similar dielectric substrate as shown in FIGS. 7a-7c. The resistive material layer provides sufficient attenuation to decrease the RF surface waves and minimize electro-magnetic scattering on the PCB. Moreover, since both the metallic and resistive layers can be applied as very thin layers, sufficient transparency can be obtained in desired areas, such as the display area.

In one implementation, the top portion of a flip type phone including the acoustic output and LCD area can be encapsulated in a high impedance, translucent material like that used in ESD packaging. The liquid crystal display (LCD) remains visible through the high impedance layer and the resulting electric field emissions were reduced by 9 dB with respect to their original (unshielded) peak location. This is graphically represented in FIG. 9. Using this embodiment, the mobile phone's plastic housing pieces, including the LCD cover, can be treated with such high impedance materials. The resulting electric fields are attenuated at the abrupt discontinuities prior to illuminating the PCB thereby minimizing the scattered E-M fields.

Figure 9:
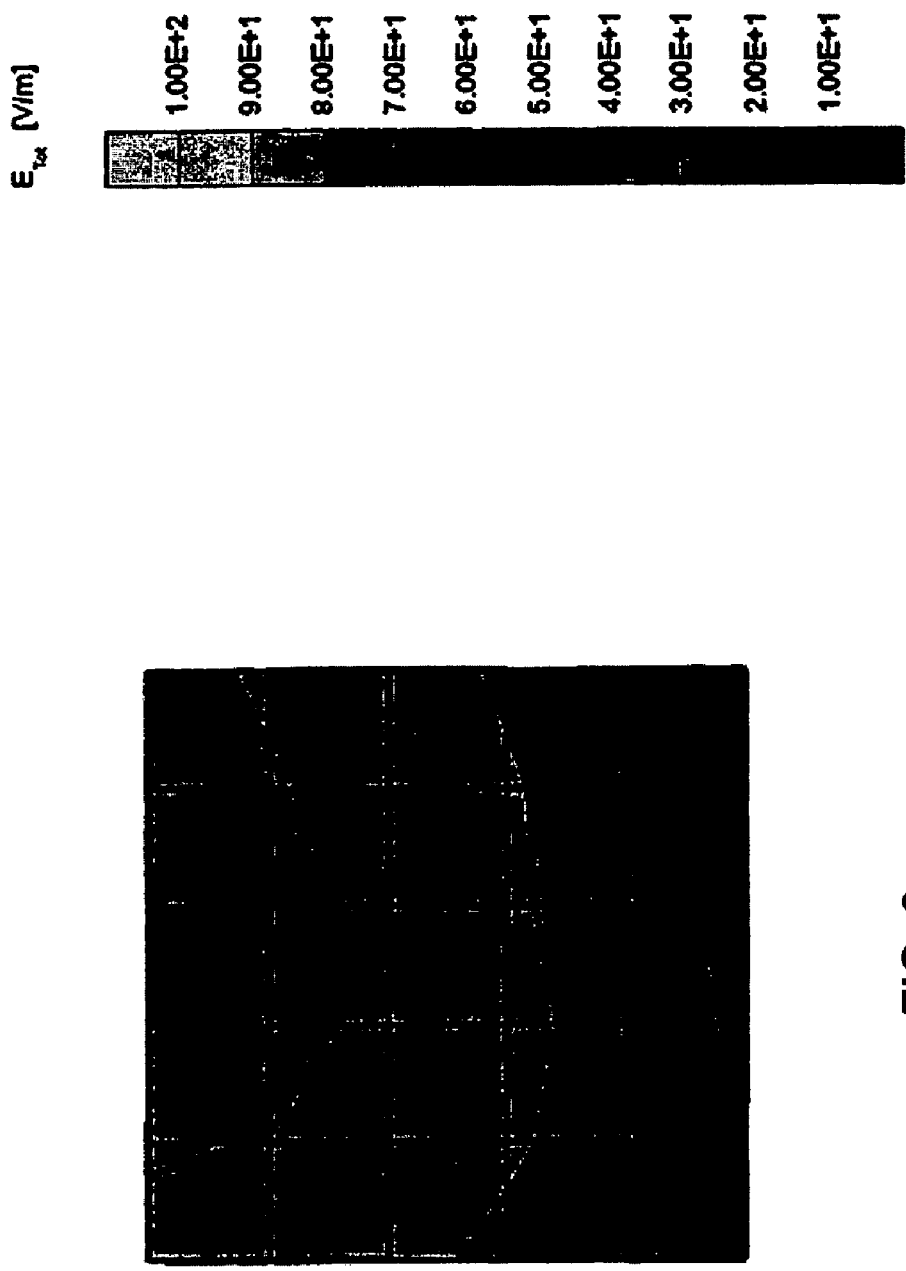
FIG. 9 is a graph of the measured electric field for the mobile phone containing a high impedance cover.

Comparing FIG. 9 (with high impedance layer) to FIG. 3 (without high impedance layer) illustrates the significant reduction of the electric field due to EM scattering. This reduction translates into less interference to a user's hearing aid when holding the mobile phone against the ear during normal use.

The invention claimed is:

1. A mobile phone structure that can attenuate undesirable electro-magnetic waves prevalent at abrupt discontinuities of metallized areas within the mobile phone during normal operation of the mobile phone, the mobile phone structure comprising:
   an impedance layer, the impedance layer being integrated into a housing of the mobile phone, the impedance layer comprising:
      a metallic layer substantially covering the metallized areas wherein the metallic layer reduces the effect of undesirable electro-magnetic waves on the side of the metallic layer opposite the substantially covered metallized areas; and
      a dielectric substrate layer having inner and outer surfaces coupled with the metallic layer.

2. The mobile phone structure of claim 1 wherein the metallic layer is coupled to the inner surface of the dielectric substrate layer.

3. The mobile phone structure of claim 1 wherein the metallic layer is coupled to the outer surface of the dielectric substrate layer.

4. The mobile phone structure of claim 1 wherein the impedance layer further comprises multiple dielectric substrate layers wherein the metallic layer is buried between a pair of dielectric substrate layers.

5. A mobile phone structure that can attenuate undesirable electro-magnetic waves prevalent at abrupt discontinuities of metallized areas within the mobile phone during normal operation of the mobile phone, the mobile phone structure comprising:
   an impedance layer, the impedance layer being integrated into a housing of the mobile phone, the impedance layer comprising a resistive layer substantially covering the metallized areas,
   wherein the resistive layer reduces the effect of undesirable electro-magnetic waves on the side of the resistive layer opposite the substantially covered metallized areas.

6. The impedance layer of claim 5 further comprising a dielectric substrate layer having inner and outer surfaces coupled with the resistive layer.

7. The impedance layer of claim 6 wherein the resistive layer is coupled to the inner surface of the dielectric substrate layer.

8. The impedance layer of claim 6 wherein the resistive layer is coupled to the outer surface of the dielectric substrate layer.

9. The impedance layer of claim 5 further comprising multiple dielectric substrate layers wherein the resistive layer is buried between a pair of dielectric substrate layers.

10. A mobile phone structure that can attenuate undesirable electro-magnetic waves prevalent at abrupt discontinuities of metallized areas within the mobile phone during normal operation of the mobile phone, the mobile phone structure comprising:
    an impedance layer, the impedance layer being integrated into a housing of the mobile phone, the impedance layer comprising:
       a metallic layer; and
       a resistive layer coupled with the non-ferrous metallic layer and integrated into the front cover of the mobile phone,
    wherein the metallic layer guides undesirable electro-magnetic waves into the resistive layer where the undesirable electro-magnetic waves are attenuated thereby reducing the effect the undesirable electro-magnetic waves prevalent at abrupt discontinuities of metallized areas.

* * * * *